US009020985B2

(12) United States Patent
Mehrotra et al.

(10) Patent No.: US 9,020,985 B2
(45) Date of Patent: Apr. 28, 2015

(54) SYSTEM AND METHOD FOR MANAGING DIRECTORIES FOR A DATABASE SYSTEM HAVING AN IN-MEMORY DATABASE

(75) Inventors: Gaurav Mehrotra, Maharashtra (IN); Abhinay Ravinder Nagpal, Maharashtra (IN); Rohit P. Raut, Pune (IN); Yan Wang Stein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 12/546,816

(22) Filed: Aug. 25, 2009

(65) Prior Publication Data

US 2011/0055242 A1  Mar. 3, 2011

(51) Int. Cl.
*G06F 17/30* (2006.01)
*H04L 29/12* (2006.01)

(52) U.S. Cl.
CPC ...... *H04L 61/1523* (2013.01); *G06F 17/30289* (2013.01); *G06F 17/3056* (2013.01)

(58) Field of Classification Search
CPC .......... G06F 17/30067; G06F 17/3007; G06F 17/30073; G06F 17/30094; G06F 17/30115; G06F 17/30117; G06F 17/30129; G06F 17/30132
USPC .............................. 707/999.01, 812, 821–827
See application file for complete search history.

(56) References Cited

U.S. PATENT DOCUMENTS

| | | | |
|---|---|---|---|
| 6,038,601 A * | 3/2000 | Lambert et al. | 709/226 |
| 6,247,017 B1 * | 6/2001 | Martin | 1/1 |
| 6,347,312 B1 * | 2/2002 | Byrne et al. | 1/1 |
| 6,615,223 B1 | 9/2003 | Shih et al. | |
| 6,763,347 B1 * | 7/2004 | Zhang | 711/117 |
| 7,788,452 B2 * | 8/2010 | Averill et al. | 711/141 |
| 2003/0191757 A1 | 10/2003 | Ambrosini et al. | |
| 2005/0071350 A1 | 3/2005 | Artale et al. | |
| 2005/0080792 A1 | 4/2005 | Ghatare | |
| 2006/0123024 A1 * | 6/2006 | Sathyanarayan et al. | 707/100 |
| 2006/0149760 A1 | 7/2006 | Keni et al. | |
| 2007/0006153 A1 | 1/2007 | Sultan | |
| 2008/0133617 A1 | 6/2008 | Bali et al. | |
| 2008/0256142 A1 | 10/2008 | Wakefield | |

FOREIGN PATENT DOCUMENTS

| | | |
|---|---|---|
| GB | 2328534 A | 2/1999 |
| JP | 2002108683 A | 4/2002 |
| WO | 9967725 A1 | 12/1999 |

OTHER PUBLICATIONS

Laszewski et al., "Usage of LDAP in Globus," Globus.com, USA—1998.

(Continued)

*Primary Examiner* — Jacob F Bétit
*Assistant Examiner* — Amanda Willis
(74) *Attorney, Agent, or Firm* — Mohammed Kashef; Edell, Shapiro & Finnan, LLC

(57) ABSTRACT

A method and system for automatically and transparently managing a directory in a database system to preferentially use of objects in an in-memory database instead of copies of the objects in disk-based databases, in order to speed up application response times. The methods and systems selectively add or update LDAP entries to leverage advantage of the database objects in the in-memory database, so that the LDAP entries point to the in-memory database instead of disk-based databases.

19 Claims, 4 Drawing Sheets

(56) References Cited

OTHER PUBLICATIONS

"Oracle Timesten® In-Memory Database," Copyright, 2009; www.oracle.com/technology/products/timesten/index.html.
"Oracle In-Memory Database Cache," Oracle Data Sheet; Copyright, 2009; www.oracle.com/technology/products/timesten/imdb_cache/index.html.
"Oracle, Timesten and PL/SQL Support," Mar. 6, 2009; http://blog.tanepoder.com/2009/03/06/oracle-timesten-and-plsql-support/.
"Oracle Timesten In-Memory Database Introduction," Release 7.0; B31687-03; pp. 1-86; http://download.oracle.com/otn_hosted_doc/timesten/702/TimesTen-Documentation/cacheconnect.pdf, dated Sep. 2007.
"Timesten Cache Connect to Oracle Guide," Release 7.0; B31685-02; pp. 1-152; http://download.oracle.com/otn_hosted_doc/timesten/703/TimesTen-Documentation/intro.pdf, dated Apr. 2007.
R. Wang, "The First Example of TimesTen with Oracle on Windows," OraclePoint.com; www.scribd.com/doc/7879020/The-First-Example-of-TimesTen-With-Oracle, Scribd upload date Nov. 11, 2008.

* cited by examiner

SYSTEM AND METHOD FOR MANAGING DIRECTORIES FOR A DATABASE SYSTEM HAVING AN IN-MEMORY DATABASE

BACKGROUND

1. Technical Field

The present invention relates generally to managing directories for a database system having an in-memory database, and more particularly to systems and methods for the automatic and transparent management of a directory in a database system to leverage the use of an in-memory database.

2. Discussion of Related Art

A catalog or directory is a mechanism that aids clients in locating entries and attributes about those entries. Entries might include network resources such as printers or web pages, information about people (e.g., a customer database or telephone directory), users (e.g., encryption certificates, passwords, and login information), or reference resources (e.g., books). For example, a client application in a computer system may access a catalog or directory containing entries regarding information stored in one or more databases on a database server or in a Database Management System (DBMS).

In the past, many applications utilized proprietary or customized interfaces to connect with the database servers and/or the DBMS, but then the lightweight directory access protocol (LDAP) was developed in order to provide a consistent and controlled system for accessing data. LDAP is an open industry standard directory services protocol that is capable of performing powerful directory service queries as well as allowing clients to issue commands that add, delete or modify directory service entries. Examples of commercial LDAP server software that can catalog many remote databases include IBM SecureWay Directory, IBM Tivoli Directory Server, Netscape LDAP Server and Microsoft Active Directory.

The LDAP directory service is based on a client-server model. Specifically, an LDAP server (or servers) contains the data comprising the LDAP directory tree, and an LDAP client can connect to the LDAP server and transmit a request for data. The server either can respond with the data, or if the data is not available locally, the server can attempt to connect to another server, typically another LDAP server, that can fulfill the request. Because the purpose of the catalog or directory is to locate entries, much of the LDAP traffic against the LDAP server comprises read operations. Because traffic can be heavy, particularly in a large or frequently-accessed database, LDAP systems utilize index files to speed search performance. Despite the use of index files, however, systems are still slowed down by the need to conduct numerous read operations from the disks on which the data is stored.

BRIEF SUMMARY

Accordingly, embodiments of the present invention include a method of managing a directory for a database system having an in-memory database, comprising receiving a user request to access a database object stored in a permanent memory-based database, in response to receiving the user request, searching an in-memory database to determine if the requested database object is also stored in the in-memory database, in response to receiving the user request, searching a directory comprising a plurality of directory entries to determine if a directory entry exists for the requested database object, where each directory entry corresponds to one of a plurality of stored database objects and indicates if the stored database object is to be accessed in the permanent memory-based database or in the in-memory database, in response to determining that the requested database object is also stored in the in-memory database and that a directory entry exists for the requested database object, determining if the directory entry indicates if the requested database object is to be accessed in the in-memory database, and if not, updating the directory entry to indicate that the requested database object is to be accessed in the in-memory database.

Other embodiments of the present invention include a computer program product comprising a computer useable medium having a computer readable program, where the computer readable program when executed on a computer causes the computer to receive a user request to access a database object stored in a permanent memory-based database, search an in-memory database to determine if the requested database object is also stored in the in-memory database, search a directory comprising a plurality of directory entries to determine if a directory entry exists for the requested database object, where each directory entry corresponds to one of a plurality of stored database objects and indicates if the stored database object is to be accessed in the permanent memory-based database or in the in-memory database, in response to determining that the requested database object is also stored in the in-memory database and that a directory entry exists for the requested database object, determine if the directory entry indicates if the requested database object is to be accessed in the in-memory database, and if not, update the directory entry to indicate that the requested database object is to be accessed in the in-memory database.

Still other embodiments of the present invention include a system for managing directories for a database system having an in-memory database, comprising a permanent memory, having a permanent memory-based database for storing a plurality of database objects stored therein, a cache memory, having an in-memory database for storing copies of at least some of the plurality of database objects stored therein, and a processor configured with logic to create and update a directory of the plurality of database objects, where the directory comprises a plurality of directory entries, each directory entry corresponding to a single database object in the plurality and indicating where the single database object is to be preferentially accessed, where the processor is further configured with logic to receive a user request to access a database object, to determine whether a directory entry exists for the requested database object, and to determine if the requested database object is stored in the in-memory database, and if a directory entry exists and indicates that the requested database object is to be preferentially accessed in the permanent memory-based database, and a copy of the requested database object is stored in the in-memory database, update the directory entry to indicate that the requested database object is to be preferentially accessed in the in-memory database.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
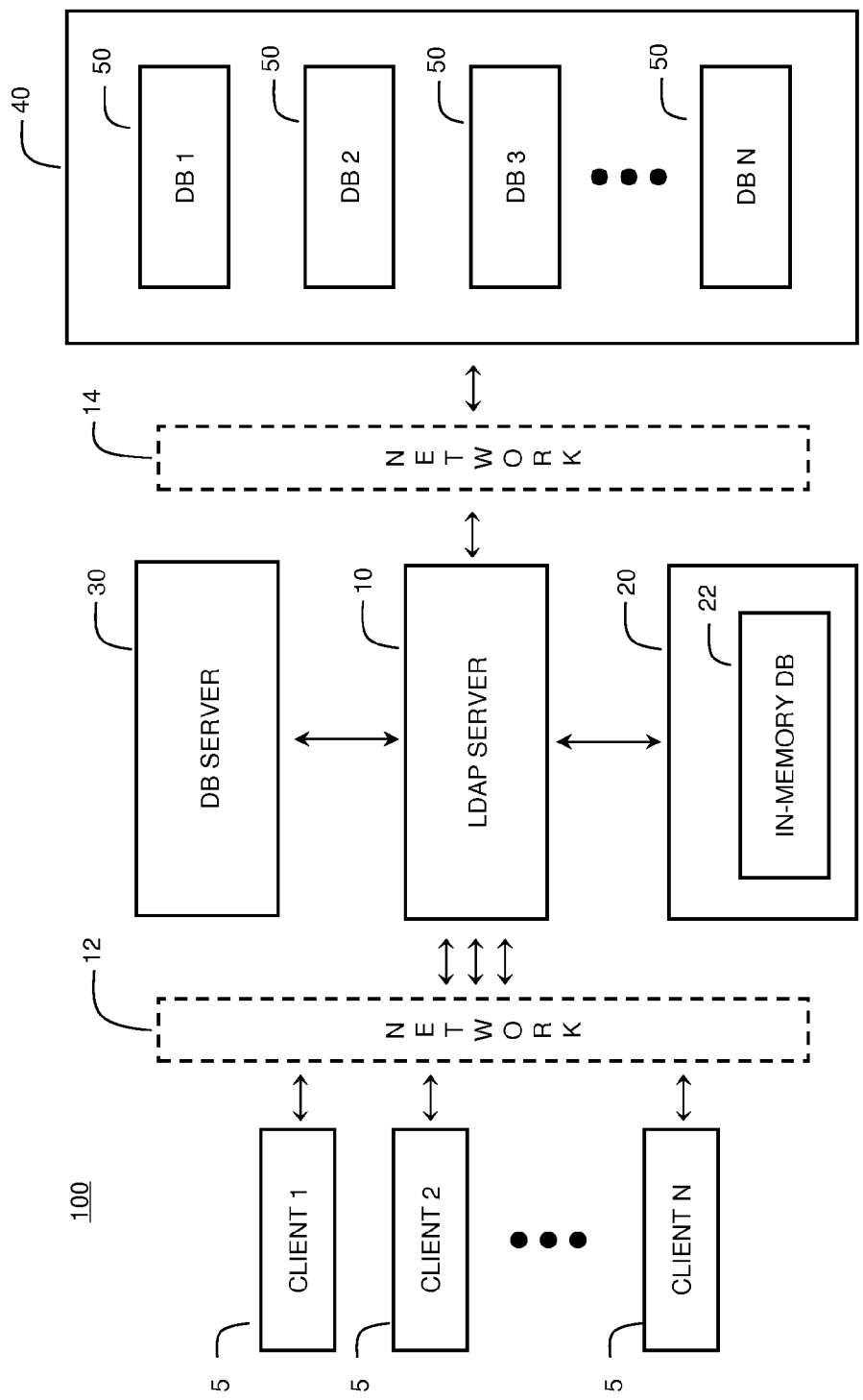
FIG. 1 is a block diagram of a database system having an in-memory database according to an embodiment of the present invention.

Referring now to the Figures, an exemplary system according to an embodiment of the present invention is illustrated in FIG. 1. The system shown in FIG. 1 is particularly suited to the management of directories for a database system having an in-memory database over a network or the Internet. The system 100 includes an LDAP server 10, memory 20 comprising an in-memory database (IMDB) 22, database server 30, and a database management system (DBMS) 40 comprising databases 50 containing data, all of which are connected over networks 12, 14 to each other and to clients 5. The system 100 may include additional servers, clients, and other devices not shown, and individual components of the system may occur either singly or in multiples, for example, there may be more than one data storage area in the system. The DBMS 40 may be local to the LDAP server 10, or remote from and in communication with the LDAP server 10 via a network 14.

Generally, clients 5 provide an interface to the functions provided by the LDAP server 10, for example, mechanisms for querying a directory, etc. The clients 5 may be local to the LDAP server 10 and DBMS 40, or remote from and in communication with the LDAP server 10 and DBMS 40 via networks 12, 14. The end-user clients 5 may be implemented by any quantity of conventional or other computer systems or devices (e.g., computer terminals, personal computers (e.g., IBM-compatible, Apple MacIntosh, tablet, laptop, etc.), cellular telephone, personal data assistant (e.g., Palm Pre, Treo, iPhone, etc.), and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information.

The LDAP server 10 manages directories for the database system, and access to the directories by clients. The LDAP server can listen for LDAP connections from clients 5, respond to LDAP operations (e.g., queries) it receives over the connections, and propagate and synchronize changes from one database to another or one LDAP server to another in the system. In a particular embodiment, the LDAP server 10 can register databases and/or database servers, publish and distribute directory information, create images in the in-memory database 22 for database objects stored in DBMS 40, create and update directory entries, and direct client queries to the appropriate directory or database.

The LDAP server 10 and database server 30 may be implemented in the form of a processing system, or may be in the form of software. A processing system may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). If embodied in software, the LDAP server 10 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Figure 2:
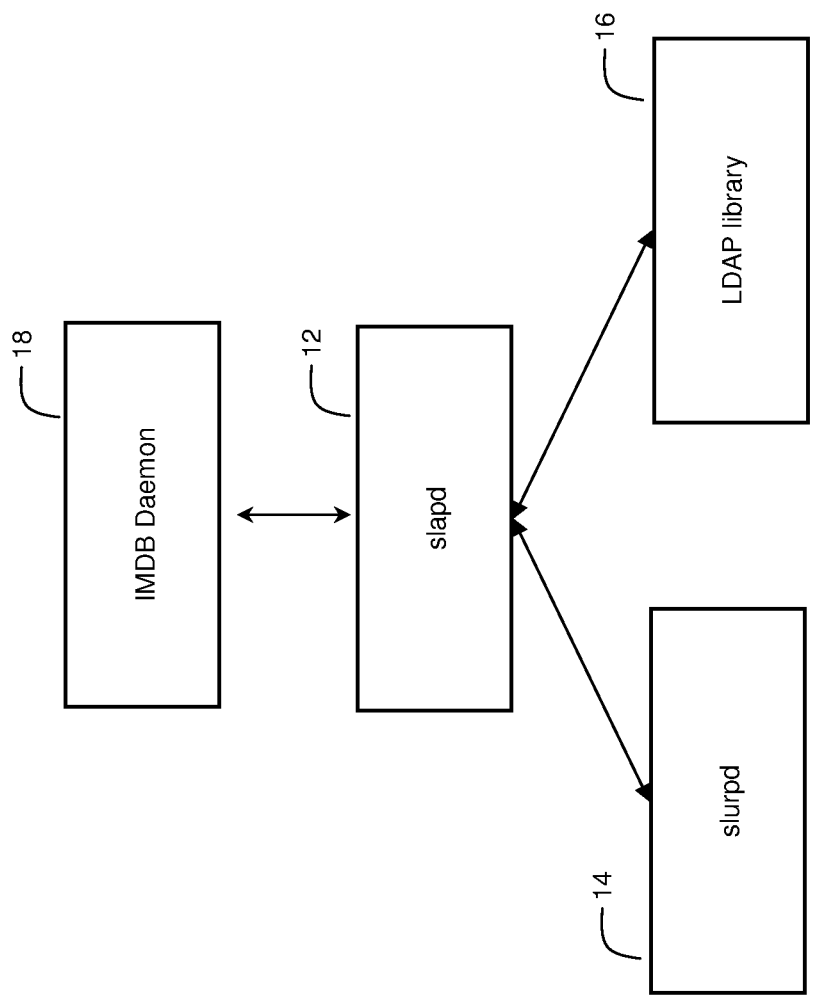
FIG. 2 is a block diagram of an LDAP server having an IMDB daemon according to an embodiment of the present invention.

For example, the LDAP server 10 can be implemented as software, for example one or more daemons, software modules, or libraries. An exemplary embodiment in which the LDAP server is based on OpenLDAP, an implementation of LDAP that runs on the Linux/UNIX operating systems, is shown in FIG. 2. In this embodiment, the LDAP server comprises OpenLDAP daemons slapd 12, which listens for LDAP connections and responds to LDAP operations received over the connections, and slurpd 14, which is a LDAP replication daemon that propagates and synchronizes changes among databases and servers, as well as an OpenLDAP library 16 that provides programmatic access to the LDAP protocol. The directory management functions of the present embodiments are provided by another daemon, in-memory database (IMDB) daemon 18. The IMDB daemon 18 can automatically update or create LDAP entries when an image is created for a particular object in an in-memory database. The updated or newly created LDAP entries directly refer to the in-memory database object, as is further explained below with reference to FIG. 4.

Memory 20 may be implemented by any conventional or other memory or storage device (e.g., RAM, cache, flash, etc.), and may include any suitable storage capacity. In-memory database 22 acts as a cache for databases 50 and contains a subset of the database objects in databases 50. Because it is an in-memory cache, the in-memory database 22 provides predictable response-times and a large increase in database performance without requiring additional disk I/O. The DBMS 40 may be local to the LDAP server 10, or remote from and in communication with the LDAP server 10 via a network 14. The DBMS 40 may be implemented by any quantity of any type of conventional or other databases (e.g., network, hierarchical, relational, object, etc.) or storage structures (e.g., files, data structures, disk or other storage, etc.). The in-memory database 22 and databases 50 may store any desired information arranged in any fashion (e.g., tables, hierarchical, relations, objects, etc.), and may store additional information such as metadata in addition to documents.

The networks 12, 14 may be implemented by any quantity of any suitable communications media (e.g., WAN, LAN, Internet, Intranet, wired, wireless, etc.). The computer systems of the present invention embodiments may include any conventional or other communications devices to communicate over the networks via any conventional or other protocols, and may utilize any type of connection (e.g., wired, wireless, etc.) for access to the network.

In operation, the LDAP server 10 automatically and transparently manages a directory in a database system 100 to leverage the use of an in-memory database 22. The management of the directory is automatic in the sense that the client application 5 does not need to take any action in order to image database objects into the in-memory database 22 and to create or update directory entries to point to the database objects in the in-memory database 22. The management of the directory can be transparent in the sense that the client application 5 is unaware that an in-memory database 22 is being referenced instead of a disk-based database 50. This is beneficial because the client application 5 need not be re-coded or changed in order to take advantage of the faster in-memory database 22.

The benefits of this automatic and transparent management can be seen from the following example. In this example, a client reporting application 5 accesses table T1 containing sales records for a company, which is stored in disk-based database 50 on server A. Disk-based database 50 may be implemented as a DB2 database. The LDAP server 10, located on server B, creates a directory containing a "Sales" entry which initially points to table T1 in the disk-based database 50, for example by containing the server ip/name/db2 authorization/schema information. At this time, the client reporting application 5 queries for sales records located in table T1, and the directory refers the query to table T1 in the disk-based database 50. After several such queries, table T1 is identified as a frequently-accessed database object, and so it is imaged into in-memory database 22 on server C as table MT1. The IMDB daemon 18 updates the directory entry "Sales" to point to table MT1 in the in-memory database 22, and automatically updates the server ip/name/db2 authorization/schema information. Now, when the client reporting application 5 queries for the sales records, it will make use of the faster in-memory copy (table MT1) instead of the slower disk-based original (table T1). Thus, the performance of the database system is enhanced without the need for any changes to the code or set-up (e.g., to point to in-memory database 22) of the client reporting application 5, or even without the need for the client reporting application 5 to even be aware of the in-memory database 22.

Figure 3:
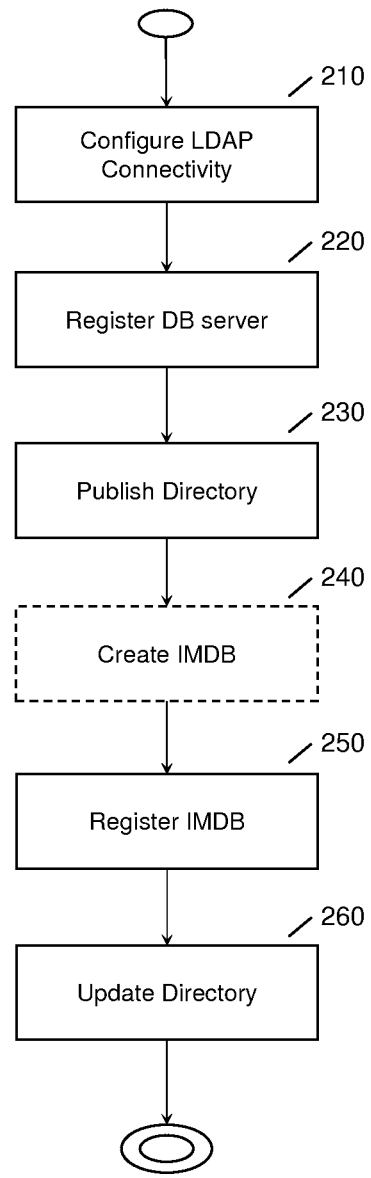
FIG. 3 is a flowchart depicting the registration and publication of a directory for a database system having an in-memory database according to an embodiment of the present invention.
Figure 4:
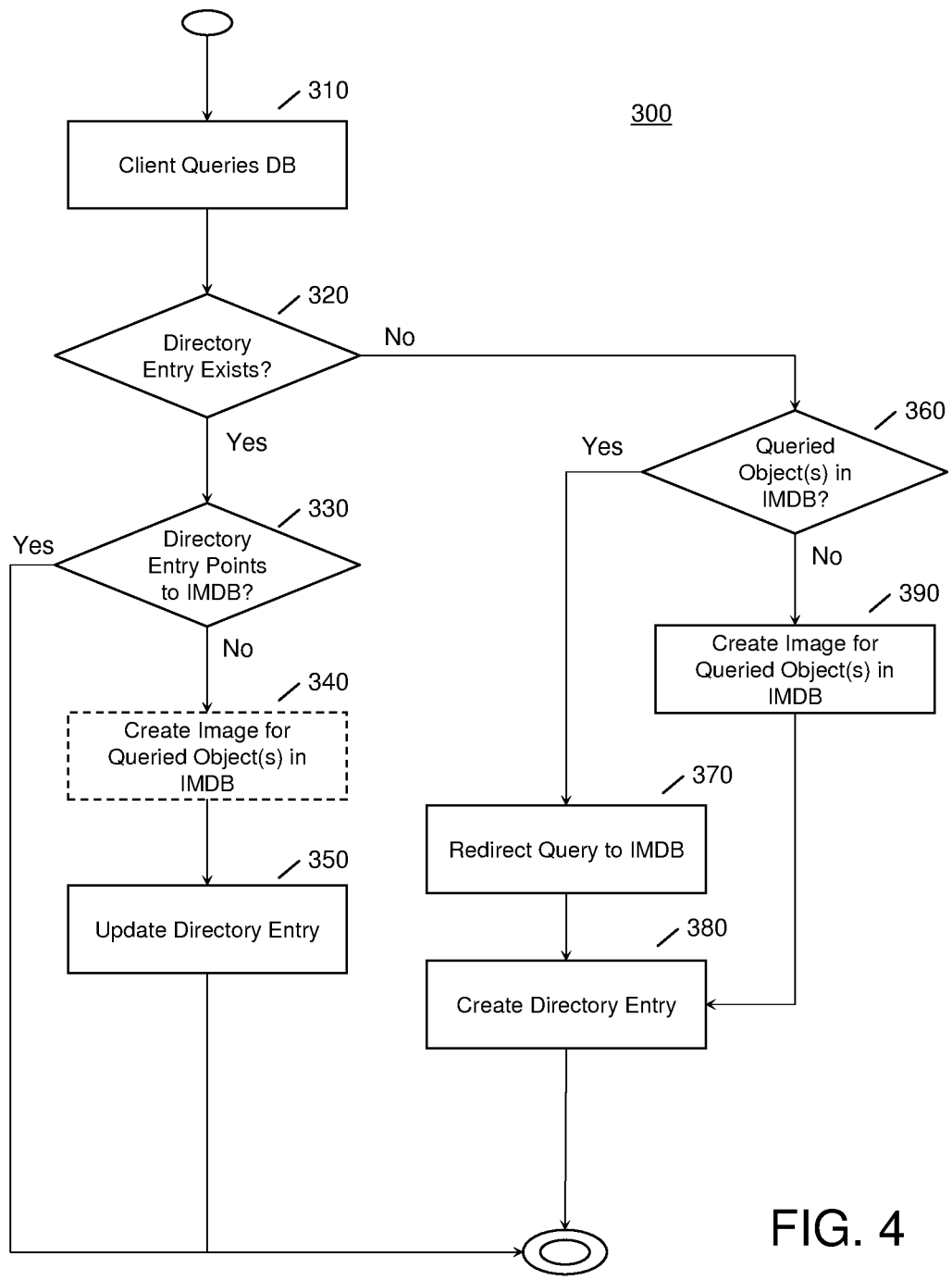
FIG. 4 is a flowchart depicting the management of a directory for a database system having an in-memory database according to an embodiment of the present invention.

A process for the registration and publication of a directory for a database system having an in-memory database according to an embodiment of the present invention is shown in FIG. 3, and a process for the management of a directory for a database system having an in-memory database according to an embodiment of the present invention is shown in FIG. 4. Generally, the steps of FIG. 3 are performed by the LDAP server 10 of FIG. 1 including the IMDB daemon 18 of FIG. 2, and the steps of FIG. 4 are performed by the IMDB daemon 18 of FIG. 2, or as described below. Although the operation of the processes is described with respect to disk-based and in-memory memory storage generally, it is understood to one skilled in the art that the processes can be used with any type of memory storage, and is not limited to disk-based or in-memory memory. For example, the memory referred to as disk-based can be any sort of permanent memory, and the memory referred to as in-memory can be any sort of cached memory.

Referring now to FIG. 3, the reference numeral 200 generally designates a flow chart depicting the registration and publication of a directory for a database system. In step 210, the LDAP server 10 configures the LDAP connectivity to the LDAP server, registers the database server 30 for the DBMS 40 in step 220, and publishes the directory information for the DBMS 40 in step 230. If it does not already exist, an in-memory database 22 can be created in step 240, for example by imaging a database 50 from DBMS 40 or by imaging selected database objects, and the in-memory database 22 is registered with the LDAP server in step 250. In step 260, the directory is updated to point to the database objects or images in the in-memory database 22 where appropriate.

The process of FIG. 3 can be implemented in any suitable fashion, for example by using IBM DB2 as the DBMS, Microsoft Active Directory to publish, store and distribute node and database directory information, and the IMDB daemon to update the directory to point to the in-memory database. In this example, assume the domain is ibm.com and the machine host name is host1, the IP Address is 123.45.67.8 and the LDAP port is listening at 987. The first step is to fire up a DB2 Command Line Windows (db2cmd). Then, the following commands are executed to configure the LDAP connectivity to Active Directory:

```
db2set DB2_ENABLE_LDAP=yes
db2set DB2LDAPHOST=123.45.67.8:987
db2set DB2LDAP_BASEDN=CN=host1,DC=ibm,DC=com
db2stop force
db2start
```

The DB2 Server is then registered into Active Directory by the following command:
    db2 register ldap as MYDB2 protocol tcpip
or the following commands if the DB2 server is remote:

```
db2 register db2 server in ldap as
protocol tcpip
hostname <168.168.168.2>
svcename <50000>
remote
instance
```

The schema, metadata and other settings in Active Directory are then configured to accommodate the DB2 related object classes and properties using the following commands, assuming that DB2 is installed at C:\IBM\SQLLIB:

```
regsvr32 C:\IBM\SQLLIB\bin\db2ads.dll
db2schex
```

In FIG. 4, the reference numeral 300 generally designates a flow chart depicting the management of a directory for a database system. In step 310, a client application 5 queries the system. The IMDB daemon 18 checks the directory to see if a directory entry for the queried object(s) exists at step 320, and if yes, the daemon determines if the directory entry points to the in-memory database 22 at step 330. If the answer is yes, the directory does not need to be updated. If the directory entry does not point to the in-memory database, then the daemon may create an image for the queried object(s) in the in-memory database at step 340 if the queried object(s) is not already in the in-memory database, and the daemon updates the directory entry to point to the in-memory database at step 350.

If the determination at step 320 was no, the daemon determines if the queried object(s) are in the in-memory database at step 360. If yes, the query is re-directed to the in-memory database at step 370, and the daemon creates a directory entry pointing to the in-memory database at step 380. If no, the daemon creates an image for the queried object(s) in the in-memory database at step 390, and then creates a directory entry pointing to the in-memory database at step 380.

The daemon may be configured according to any desired policy, for example to operate with a variety of client applications, and may be customized by a user or administrator to function as desired for a particular application or DBMS. For example, the daemon may be configured so that in the management process described in FIG. 4, a new directory entry pointing to the in-memory database is created at step 350, instead of updating an existing entry. Alternatively, the daemon may be configured so that certain directory entries are updated, while other directory entries are left unchanged and new directory entries are created instead.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages, data storage may be implemented in MySQL, Oracle, SQL Server, IBM DB2, IBM solidDB, Informix, Oracle TimesTen or a flat database, the clients may be implemented in Apache Directory Studio, Apple Directory Utility, Apple Workgroup Manager, GQ, JXplorer, LDAPAdmin, LDAP Browser/Editor, MaXware Directory Explorer, Microsoft Active Directory Explorer, or any other LDAP client software, and the LDAP server may be implemented in Apache Directory Server, Apple Open Directory, IBM Tivoli Directory Server, Microsoft Active Directory, Netscape LDAP Server, Novell eDirectory, OpenLDAP, Oracle Internet Directory, Symlabs Virtual Directory Server, Sun Java System Directory Server, or any other LDAP server software, etc. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention may be distributed in any manner among the LDAP server, database server, and client systems.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing a directory for a database system having an in-memory database and a plurality of permanent memory-based databases, comprising:
   receiving a user request to access a database object stored in a permanent memory-based database;
   in response to receiving the user request, performing a first search of the in-memory database to determine when the requested database object is also stored in the in-memory database;
   in response to receiving the user request, performing a second search of a directory for database objects in the plurality of permanent memory-based databases comprising a plurality of directory entries to determine when a directory entry exists in the directory for the requested database object, wherein each directory entry in the directory corresponds to one of a plurality of stored database objects stored in the permanent memory-based databases and indicates a location from which to access that stored database object including one of a specific permanent memory-based database containing the stored database object and the in-memory database;
   in response to the first search determining that the requested database object is also stored in the in-memory database and the second search determining that a directory entry exists for the requested database object and indicates the specific permanent memory-based database, modifying the directory entry in the directory for the requested database object to indicate that the requested database object is to be accessed in the in-memory database;
   in response to the first search determining that the requested database object is also stored in the in-memory database and the second search determining that no directory entry exists in the directory for the requested database object, creating a directory entry in the directory for the requested database object to indicate that the requested database object is to be accessed in the in-memory database; and
   accessing the requested database object from the in-memory database in response to the corresponding directory entry for the requested database object indicating the in-memory database.

2. The method according to claim 1, wherein at least one of the steps is implemented on a computer system.

3. The method according to claim 1, wherein the permanent memory-based database is a disk-based database.

4. The method according to claim 1, wherein the directory is a lightweight directory access protocol (LDAP) directory.

5. The method according to claim 1, further comprising:
   in response to the first search determining that the requested database object is not stored in the in-memory database, creating a copy of the requested database object and storing the copy in the in-memory database.

6. The method according to claim 5, further comprising:
   in response to the second search determining that no directory entry exists for the requested database object, creating a directory entry in the directory to indicate that the requested database object is to be accessed in the in-memory database.

7. The method according to claim 5, further comprising:
   in response to the second search determining that a directory entry exists for the requested database object, updating the directory entry in the directory to indicate that the requested database object is to be accessed in the in-memory database.

8. A computer program product comprising a non-transitory computer useable medium having a computer readable program for managing a directory for a database system having an in-memory database and a plurality of permanent memory-based databases, wherein the computer readable program when executed on a computer cause the computer to:

receive a user request to access a database object stored in a permanent memory-based database;

perform a first search of the in-memory database to determine when the requested database object is also stored in the in-memory database;

perform a second search of a directory for database objects in the plurality of permanent memory-based databases comprising a plurality of directory entries to determine when a directory entry exists in the directory for the requested database object, wherein each directory entry in the directory corresponds to one of a plurality of stored database objects stored in the permanent memory-based databases and indicates a location from which to access that stored database object including one of a specific permanent memory-based database containing the stored database object and the in-memory database;

in response to the first search determining that the requested database object is also stored in the in-memory database and the second search determining that a directory entry exists for the requested database object and indicates the specific permanent memory-based database, modify the directory entry in the directory for the requested database object to indicate that the requested database object is to be accessed in the in-memory database;

in response to the first search determining that the requested database object is also stored in the in-memory database and the second search determining that no directory entry exists in the directory for the requested database object, create a directory entry in the directory for the requested database object to indicate that the requested database object is to be accessed in the in-memory database; and access the requested database object from the in-memory database in response to the corresponding directory entry for the requested database object indicating the in-memory database.

9. The computer program product of claim 8, wherein the computer program product is stored on a computer useable optical storage medium.

10. The computer program product of claim 8, wherein the computer program product is stored on a hard disk.

11. The computer program product of claim 8, wherein the directory is a lightweight directory access protocol (LDAP) directory.

12. The computer program product of claim 8, further comprising:

in response to the first search determining that the requested database object is not stored in the in-memory database, creating a copy of the requested database object and storing the copy in the in-memory database.

13. The computer program product of claim 12, further comprising:

in response to the second search determining that no directory entry exists for the requested database object, creating a directory entry in the directory to indicate that the requested database object is to be accessed in the in-memory database.

14. The computer program product of claim 12, further comprising:

in response to the second search determining that a directory entry exists for the requested database object, updating the directory entry in the directory to indicate that the requested database object is to be accessed in the in-memory database.

15. A system for managing a directory for a database system having an in-memory database, comprising:

a plurality of permanent memories, having a plurality of permanent memory-based databases for storing a plurality of database objects therein;

a cache memory, having an in-memory database for storing copies of at least some of said plurality of database objects therein; and a processor configured with logic to:

receive a user request to access a database object stored in a permanent memory-based database;

perform a first search of the in-memory database to determine when the requested database object is also stored in the in-memory database;

perform a second search of a directory for database objects in the plurality of permanent memory-based databases comprising a plurality of directory entries to determine when a directory entry exists in the directory for the requested database object, wherein each directory entry in the directory corresponds to one of a plurality of stored database objects stored in the permanent memory-based databases and indicates a location from which to access that stored database object including one of a specific permanent memory-based database containing the stored database object and in the in-memory database;

in response to the first search determining that the requested database object is also stored in the in-memory database and the second search determining that a directory entry exists for the requested database object and indicates the specific permanent memory-based database, modify the directory entry in the directory for the requested database object to indicate that the requested database object is to be accessed in the in-memory database;

in response to the first search determining that the requested database object is also stored in the in-memory database and the second search determining that no directory entry exists in the directory for the requested database object, create a directory entry in the directory for the requested database object to indicate that the requested database object is to be accessed in the in-memory database; and access the requested database object from the in-memory database in response to the corresponding directory entry for the requested database object indicating the in-memory database.

16. The system of claim 15, wherein the permanent memory is located remotely from the processor and the cache memory.

17. The system of claim 15, wherein the directory is a lightweight directory access protocol (LDAP) directory.

18. The system of claim 15, wherein the processor is further configured with logic to, in response to the first search determining that the requested database object is not stored in the in-memory database, store a copy of the requested database object in the in-memory database.

19. The system of claim 18, wherein the processor is further configured with logic to,
- in response to the second search determining that no directory entry exists in the directory, create a directory entry in the directory to indicate that the requested database object is to be preferentially accessed in the in-memory database, and
- in response to the second search determining that a directory entry exists for the requested database object, update the directory entry in the directory to indicate that the requested database object is to be preferentially accessed in the in-memory database.

\* \* \* \* \*